(12) United States Patent
Sommers et al.

(10) Patent No.: US 12,407,600 B2
(45) Date of Patent: Sep. 2, 2025

(54) METHODS, SYSTEMS, AND COMPUTER READABLE MEDIA FOR SMARTSWITCH SERVICE CHAINING

(71) Applicant: Keysight Technologies, Inc., Santa Rosa, CA (US)

(72) Inventors: Christian Paul Sommers, Bangor, CA (US); Peter J. Marsico, Chapel Hill, NC (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 267 days.

(21) Appl. No.: 17/979,897

(22) Filed: Nov. 3, 2022

(65) Prior Publication Data

US 2024/0154896 A1 May 9, 2024

(51) Int. Cl.
*H04L 45/0377* (2022.01)
(52) U.S. Cl.
CPC ................ *H04L 45/0377* (2022.05)
(58) Field of Classification Search
CPC .................................................. H04L 45/0377
See application file for complete search history.

(56) References Cited

U.S. PATENT DOCUMENTS

| | | | |
|---|---|---|---|
| 6,917,595 B2 | 7/2005 | Chang et al. | |
| 7,145,866 B1 | 12/2006 | Ting et al. | |
| 7,200,865 B1 | 4/2007 | Roscoe et al. | |
| 7,526,691 B1 | 4/2009 | Jayabharathi et al. | |
| 7,689,736 B2 | 3/2010 | Kalwitz | |
| 7,899,048 B1 | 3/2011 | Walker et al. | |
| 7,990,849 B2 | 8/2011 | McGee et al. | |
| 9,215,161 B2 | 12/2015 | McGee | |
| 9,497,039 B2 | 11/2016 | Greenberg et al. | |
| 9,647,909 B2 | 5/2017 | Kuan et al. | |
| 9,674,639 B2 | 6/2017 | Qiu et al. | |

(Continued)

FOREIGN PATENT DOCUMENTS

| | | |
|---|---|---|
| CN | 104320274 A | 1/2015 |
| CN | 108353004 B | 1/2022 |

(Continued)

OTHER PUBLICATIONS

"Cloud-Based Deployment of Network Test Tools", IP.com, Pub. Id. IPCOM000254477D, Jul. 2018.

(Continued)

*Primary Examiner* — Phuoc H Nguyen
*Assistant Examiner* — Steven C Nguyen (57) ABSTRACT

Methods, systems, and computer readable media for smartswitch service chaining are disclosed. One example method occurs at a smartswitch controller implemented using at least one processor, the method comprising: receiving service chain configuration information indicating a service chain involving services performed using data processing units (DPUs) in at least one smartswitch; generating, using the service chain configuration information, one or more switching rules for causing traffic at the at least one smartswitch to be directed to one or more of the DPUs associated with the service chain; and providing the one or more switching rules to the at least one smartswitch or a management entity for implementing the one or more switching rules at the at least one smartswitch.

18 Claims, 5 Drawing Sheets

(56) References Cited

U.S. PATENT DOCUMENTS

| | | | |
|---|---|---|---|
| 9,680,728 | B2 | 6/2017 | Besser |
| 9,705,849 | B2 | 7/2017 | Sood et al. |
| 9,858,104 | B2 | 1/2018 | Tripathi et al. |
| 9,967,165 | B2 | 5/2018 | Arora et al. |
| 10,069,694 | B1 | 9/2018 | Schwartz et al. |
| 10,135,702 | B2 | 11/2018 | Lahiri |
| 10,541,901 | B2 | 1/2020 | Raney |
| 10,623,309 | B1 | 4/2020 | Gampel et al. |
| 10,693,817 | B1 | 6/2020 | Melkild |
| 10,728,135 | B2 | 7/2020 | Raney |
| 10,764,169 | B2 | 9/2020 | Mircescu |
| 10,812,349 | B2 | 10/2020 | Raney et al. |
| 10,929,175 | B2 | 2/2021 | Goyal et al. |
| 11,038,770 | B2 | 6/2021 | Raney |
| 11,388,081 | B1 | 7/2022 | Sommers et al. |
| 11,398,968 | B2 | 7/2022 | Laslau |
| 11,593,297 | B2 | 2/2023 | Hamlin et al. |
| 11,853,254 | B1 | 12/2023 | Sommers et al. |
| 2002/0169822 | A1 | 11/2002 | Packard et al. |
| 2005/0270980 | A1 | 12/2005 | McGee |
| 2006/0072543 | A1 | 4/2006 | Lloyd et al. |
| 2006/0129847 | A1 | 6/2006 | Pitsos |
| 2007/0038744 | A1 | 2/2007 | Cocks et al. |
| 2007/0195776 | A1 | 8/2007 | Zheng et al. |
| 2007/0280243 | A1 | 12/2007 | Wray et al. |
| 2008/0044018 | A1 | 2/2008 | Scrimsher et al. |
| 2009/0287837 | A1 | 11/2009 | Felsher |
| 2010/0138920 | A1 | 6/2010 | Kim et al. |
| 2010/0199275 | A1 | 8/2010 | Mudigonda et al. |
| 2010/0238923 | A1 | 9/2010 | Cheon et al. |
| 2010/0317420 | A1 | 12/2010 | Hoffberg |
| 2011/0116719 | A1 | 5/2011 | Bilobrov |
| 2011/0125892 | A1 | 5/2011 | Rajan et al. |
| 2012/0106423 | A1 | 5/2012 | Nylander et al. |
| 2012/0290703 | A1 | 11/2012 | Barabash et al. |
| 2012/0317566 | A1 | 12/2012 | Santos et al. |
| 2013/0159021 | A1 | 6/2013 | Felsher |
| 2013/0288668 | A1 | 10/2013 | Pragada et al. |
| 2014/0052852 | A1 | 2/2014 | Dufour et al. |
| 2014/0229605 | A1 | 8/2014 | Besser |
| 2014/0229781 | A1 | 8/2014 | Whetsel |
| 2014/0229945 | A1 | 8/2014 | Barkai et al. |
| 2014/0269709 | A1 | 9/2014 | Benny et al. |
| 2014/0317293 | A1 | 10/2014 | Shatzkamer |
| 2014/0317600 | A1 | 10/2014 | Klunder et al. |
| 2015/0029848 | A1 | 1/2015 | Jain |
| 2015/0063166 | A1 | 3/2015 | Sif et al. |
| 2015/0234725 | A1 | 8/2015 | Cillis et al. |
| 2015/0236936 | A1 | 8/2015 | Waldbusser |
| 2015/0332357 | A1 | 11/2015 | McBride et al. |
| 2015/0333979 | A1 | 11/2015 | Schwengler et al. |
| 2016/0050131 | A1* | 2/2016 | Zhang ............... H04L 45/38 370/244 |
| 2016/0062781 | A1 | 3/2016 | Tsirkin et al. |
| 2016/0080263 | A1* | 3/2016 | Park ............... G06F 16/9535 370/392 |
| 2016/0110211 | A1 | 4/2016 | Karnes |
| 2016/0127333 | A1 | 5/2016 | Sood et al. |
| 2016/0147987 | A1 | 5/2016 | Jang et al. |
| 2016/0191545 | A1 | 6/2016 | Nanda et al. |
| 2016/0232019 | A1 | 8/2016 | Shah et al. |
| 2016/0248858 | A1 | 8/2016 | Qiu et al. |
| 2016/0323193 | A1 | 11/2016 | Zhou et al. |
| 2016/0323243 | A1 | 11/2016 | LeVasseur et al. |
| 2016/0352578 | A1 | 12/2016 | Chen et al. |
| 2017/0026806 | A1 | 1/2017 | Jampani et al. |
| 2017/0048110 | A1 | 2/2017 | Wu et al. |
| 2017/0085459 | A1 | 3/2017 | Xia et al. |
| 2017/0094002 | A1 | 3/2017 | Kumar et al. |
| 2017/0099195 | A1 | 4/2017 | Raney |
| 2017/0099197 | A1 | 4/2017 | Raney |
| 2017/0111230 | A1* | 4/2017 | Srinivasan ............ H04L 41/342 |
| 2017/0118102 | A1 | 4/2017 | Majumder et al. |
| 2017/0141974 | A1 | 5/2017 | Lahiri |
| 2017/0163510 | A1 | 6/2017 | Arora et al. |
| 2017/0195292 | A1* | 7/2017 | Pham ............... H04L 49/25 |
| 2017/0214694 | A1 | 7/2017 | Yan |
| 2018/0316543 | A1 | 11/2018 | Hwang |
| 2019/0109769 | A1* | 4/2019 | Jain ............... H04L 67/563 |
| 2020/0028772 | A1 | 1/2020 | Laslau |
| 2020/0034173 | A1 | 1/2020 | Rosenberg et al. |
| 2020/0099625 | A1* | 3/2020 | Yigit ............... H04L 45/302 |
| 2020/0259741 | A1* | 8/2020 | Park ............... H04L 45/38 |
| 2020/0412607 | A1 | 12/2020 | Guan et al. |
| 2021/0194828 | A1 | 6/2021 | He et al. |
| 2021/0295181 | A1 | 9/2021 | Goyal et al. |
| 2021/0320820 | A1 | 10/2021 | Ruan et al. |
| 2022/0377027 | A1 | 11/2022 | Gai et al. |
| 2024/0137312 | A1* | 4/2024 | Zhu ............... H04L 45/247 |

FOREIGN PATENT DOCUMENTS

| | | | |
|---|---|---|---|
| EP | 3046288 | A1 | 7/2016 |
| EP | 3110106 | A1 | 12/2016 |
| EP | 3119034 | A1 | 1/2017 |
| WO | 2014030061 | A2 | 2/2014 |
| WO | 2017083024 | A1 | 5/2017 |

OTHER PUBLICATIONS

Notice of Allowance and Fee(s) Due for U.S. Appl. No. 17/962,453 (Aug. 10, 2023).

GigaIO Networks, "Rack-Scale Composable Infrastructure," Primer by GigaIO Networks, pp. 1-10, 2021.

Mellor, Chris, "Element invisibility in composable systems: PCIe vs Ethernet," Oct. 4, 2021.

Venkatraman et al., "Managing and Configuring Network through Software Defined Networking (SDN)," International Journal of Computer Science and Mobile Computing vol. 2 Issue. 11, Nov. 2013, p. 146-154.

"Aruba CX 10000 Series Switch with Pensando" Pensando, pp. 1-3 (2021).

Matsushima, "Network Programmability 'Squared'", SoftBank Corp, pp. 1-25 (2022).

Notice of Allowance for U.S. Appl. No. 16/039,283 (Mar. 9, 2022).

Notification of the Decision to Grant a Patent Right for Patent for Invention for Chinese Patent Application Serial No. 201680065423.9 (Oct. 11, 2021).

Non-Final Office Action for U.S. Appl. No. 16/039,283 (Jul. 22, 2021).

Decision to grant a European patent pursuant to Article 97(1) EPC for European Patent Application Serial No. 16864727.9 (Jul. 1, 2021).

Office Action for Chinese Patent Application Serial No. 2021051802456380 (May 21, 2021).

Advisory Action, Examiner-Initiate Interview Summary, and AFCP 2.0 Decision for U.S. Appl. No. 16/039,283 (Mar. 30, 2021).

Communication under Rule 71(3) EPC Intention to Grant for European Patent Application Serial No. 16 864 727.9 (Feb. 18, 2021).

Final Office Action for U.S. Appl. No. 16/039,283 (Dec. 31, 2020).

Non-Final Office Action for U.S. Appl. No. 16/039,283 (Jul. 8, 2020).

Communication pursuant to Article 94(3) EPC for European Application Serial No. 16 864 727.9 (May 4, 2020).

Commonly-Assigned, co-pending U.S. Appl. No. 16/039,283 for "Methods, Systems, and Computer Readable Media for Testing Virtualized Network Functions and Related Infrastructure," (Unpublished, filed Jul. 18, 2018).

Notice of Allowance and Fee(s) Due and Examiner-Initiated Interview Summary for U.S. Appl. No. 14/939,674 (Jul. 13, 2018).

Advisory Action and AFCP 2.0 Decision for U.S. Appl. No. 14/939,674 (May 4, 2018).

Final Office Action for U.S. Appl. No. 14/939,674 (Feb. 9, 2018).

Corrected Notice of Allowability for U.S. Appl. No. 14/960,865 (Feb. 7, 2018).

Notice of Allowance and Fee(s) Due for U.S. Appl. No. 14/960,865 (Jan. 2, 2018).

(56) References Cited

OTHER PUBLICATIONS

Non-Final Office Action for U.S. Appl. No. 14/939,674 (Sep. 21, 2017).
Non-Final Office Action for U.S. Appl. No. 14/960,865 (Apr. 21, 2017).
Notice of Allowance and Fee(s) Due & Examiner-Initiated Interview Summary for U.S. Appl. No. 13/765,628 (Jan. 10, 2017).
Notification of Transmittal of the International Search Report and the Written Opinion of the International Searching Authority, or the Declaration for International Application No. PCT/US2016/054163 (Jan. 5, 2017).
Advisory Action and Examiner Initiated Interview Summary for U.S. Appl. No. 13/765,628 (Oct. 17, 2016).
Final Office Action for U.S. Appl. No. 13/765,628 (Jul. 27, 2016).
"Virtual Taps," Net Optics: Architecting Visibility Into Your Netowrk, p. 1-5 (accessed Jun. 30, 2016).
Giotis et al., "Policy-based Orchestration of NFV Services in Software-Defined Networks," IEEE, pp. 1-5 (2015).
Xia et al., "Resource Optimization for Service Chain Monitoring in Software-Defined Networks," Fourth European Workshop on Software Defined Networks, IEEE, pp. 1-6 (2015).
Commonly-Assigned, co-pending U.S. Appl. No. 14/960,865 for "Methods, Systems, and Computer Readable Media for Packet Monitoring in a Virtual Environment," (Unpublished, filed Dec. 7, 2015).
"Network function virtualization," https://en.wikipedia.org/wiki/Network_function_virtualization, pp. 1-7 (Nov. 23, 2015).
"Software-defined networking," https://en.wikipedia.org/wiki/Software-defined_networking, pp. 1-9 (Nov. 13, 2015).
Commonly-Assigned, co-pending U.S. Appl. No. 14/939,674 for "Methods, Systems, and Computer Readable Media for Testing Network Function Virtualization (NFV)," (Unpublished, filed Nov. 12, 2015).
"Ixia Phantom vTap with TapFlow Filtering," Ixia Data Sheet, Document No. 915-6805-01 Rev K, pp. 1-4 (Jul. 2015).
Non-Final Office Action for U.S. Appl. No. 13/765,628 (Dec. 1, 2014).
Chi et al., "Efficient NFV Deployment in Data Center Networks," IEEE ICC 2015—Next Generation Networking Symposium, pp. 1-6 (2015).
"Network Emulation", Wikipedia, https://en.wikipedia.org/w/index.php?%20title=Network%20emulation&oldid=512021569, pp. 1-2 (Mar. 2007).
Combined Search and Examination Report for Great Britain Patent Application Serial No. 2315300.0 (Mar. 15, 2024).
Intent to Grant for Great Britain Patent Application Serial No. 2315300.0 (Mar. 14, 2025).

* cited by examiner

| SERVICE CHAIN ID | SERVICE CHAIN DATA (E.G., SERVICE AGENT LOCATION DATA) | SWITCHING RULES |
|---|---|---|
| CHAIN '1' | DPU A:SA 1, DPU B:SA 2 | RULES FOR SS 1 |
| CHAIN '2' | DPU D:SA 4, DPU K:SA 11 | RULES FOR SS 1 AND SS 2 |
| CHAIN '3' | DPU C:SA 3, DPU G:SA 7, DPU F:SA 6 | RULES FOR SS 1 |
| CHAIN '4' | DPU E:SA 5, DPU I:SA 9 | RULES FOR SS 1 AND SS 2 |
| CHAIN '5' | DPU J:SA 10, DPU L:SA 12 | RULES FOR SS 2 |
| CHAIN '6' | DPU E:SA 5, DPU I:SA 9, DPU J:SA 10, DPU L:SA 12 | RULES FOR SS 1 AND SS 2 |

METHODS, SYSTEMS, AND COMPUTER READABLE MEDIA FOR SMARTSWITCH SERVICE CHAINING

TECHNICAL FIELD

The subject matter described herein relates to network testing, monitoring, and/or security. More specifically, the subject matter relates to methods, systems, and computer readable media for smartswitch service chaining.

BACKGROUND

Data center environments or large scale computing environment typically provide high reliability and security and typically include networked resources (e.g., virtual or physical servers connected via network switches) sharable by multiple clients of the data center operator and may utilize software defined network (SDN) and/or virtualization. In some computing environments, an SDN or other network may utilize smartswitches. For example, a smartswitch may include a main processor (e.g., a central processing unit (CPU)), a switch processor (e.g., a switching application-specific integrated circuit (ASIC)), and multiple DPUs (e.g., programmable processors that allow the user to program a respective processing pipeline for specific processing tasks) and may act as a switch in a switching fabric. In this example, two or more smartswitches or DPUs thereof may be configured for high-availability (HA), where HA related traffic (e.g., keep-alive messages, HA sync messages, or failover messages, etc.) may be communicated between the smartswitches such that if a smartswitch fails, the other smartswitch can handle the failed smartswitch's workload with little to no downtime. While HA related traffic and/or other traffic may be communicated between smartswitches or DPUs therein, communications to or from DPUs of the smartswitches are generally internal and, as such, monitoring and testing DPU traffic or related functions can be difficult, tedious, and/or inefficient. Moreover, when services or tasks (e.g., a packet processing service or task, a security service or task, a monitoring service or task, a testing service or task, etc.) are implemented at or by various DPUs or nodes in a smartswitch computing environment, the use of effective and/or efficient service chaining in the smartswitch computing environment can significantly impact performance and/or related results.

SUMMARY

Methods, systems, and computer readable media for smartswitch service chaining are disclosed. One example method occurs at a smartswitch controller implemented using at least one processor, the method comprising: receiving service chain configuration information indicating a service chain involving services performed using data processing units (DPUs) in at least one smartswitch; generating, using the service chain configuration information, one or more switching rules for causing traffic at the at least one smartswitch to be directed to one or more of the DPUs associated with the service chain; and providing the one or more switching rules to the at least one smartswitch or a management entity for implementing the one or more switching rules at the at least one smartswitch.

One example system includes a smartswitch controller implemented using at least one processor and a memory, the smartswitch controller configured for: receiving service chain configuration information indicating a service chain involving services performed using data processing units (DPUs) in at least one smartswitch; generating, using the service chain configuration information, one or more switching rules for causing traffic at the at least one smartswitch to be directed to one or more of the DPUs associated with the service chain; and providing the one or more switching rules to the at least one smartswitch or a management entity for implementing the one or more switching rules at the at least one smartswitch.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to a physical computer platform including one or more processors, network interfaces, and memory.

As used herein, each of the terms 'function', 'engine', and 'module' refers to hardware, which may also include software and/or firmware, for implementing the feature(s) being described.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for smartswitch service chaining. Smartswitches may be devices that include a main processor (e.g., a central processing unit (CPU), a switch processor (e.g., a switching application-specific integrated circuit (ASIC) or a programmable switch chip), and multiple data processing units (DPUs) (e.g., smart network interface cards (SmartNICs), infrastructure processing units (IPUs), etc.) for performing one or more processing tasks. The DPUs and/or other entities in a particular smartswitch may be connected via high-speed, internal links (e.g., using an Ethernet based serdes transmission system, an internal switch fabric, a communications bus, or another transmission system) and traffic communicated between two DPUs in the smartswitch may traverse one or more these internal link(s), e.g., without this intra-switch traffic traversing external Ethernet links.

However, communications between a smartswitch (or a DPU therein) and an external entity (e.g., a second smartswitch or a DPU therein) may be notable slower than solely internal communications because such traffic traverses external Ethernet links accessible via the smartswitch's switch processor. For example, inter-smartswitch packet traffic may be communicated over 100 gigabits per second (Gbps) Ethernet external links in a data center environment. In this example, a packet processed or generated by a DPU in a first smartswitch may transit an Ethernet-like internal fabric link to a switch processor and the switch processor may direct the packet to an egress network interface card (NIC) or other entity of the smartswitch, where the packet is transmitted via an external, egress Ethernet link to a second smartswitch (which is perhaps located in a different equipment rack, or different data center facility, etc.) for processing by a DPU therein. Continuing with this example, the second smartswitch may receive the packet and communicate (via an internal link or transmission system) the packet to its switch processor, where the switch processor directs or sends the packet to a DPU therein for processing, e.g., via an internal link. As such, traffic in a smartswitch computing environment can involve internal and external link resources of a smartswitch and, as such, usage of these resources can affect communications speed and, as such, related performance of the smartswitches and/or the overall datacenter switching fabric environment (e.g., production environment, system under test, etc.).

In some computing environments, DPUs in a smartswitch may be configured to implement one or more services or tasks (e.g., infrastructure processing tasks, monitoring & security tasks, machine learning processing tasks, etc.) and a controller or management entity may configure network nodes to utilize these services in a particular order when processing specific traffic (e.g., a traffic flow or related packets). For example, if a smartswitch has six DPUs, each DPU in the smartswitch may implement a different but related processing task. In this example, it may be beneficial if a certain packet flow (e.g., related packets, such as packets of a same session or packets between the same two endpoints) is processed by a service chain (e.g., multiple services performed in a particular order) implemented using the DPUs in the smartswitch. However, it is inefficient and can significantly impact performance if service chain processing requires waiting until packets are outside (e.g., external to) a smartswitch before diverting or re-routing the packets back to the smartswitch for a subsequent service of a service chain (e.g., by programming a network node to intercept relevant packets each time they leave the smartswitch and then to re-route the packets to a DPU of the smartswitch for a subsequent service of a service chain). Hence, when services or tasks (e.g., a packet processing service or task, a security service or task, a monitoring service or task, a testing service or task, etc.) are implemented at or by various DPUs or nodes in a smartswitch computing environment, the use of effective and/or efficient smartswitch service chaining can significantly impact performance and/or related results.

In accordance with some aspects of the subject matter described herein, techniques, methods, or mechanisms are disclosed for smartswitch service chaining. For example, a network testing, monitoring, and/or security systems (NTMSS) or a related entity therein (e.g., a smartswitch controller, a software defined network (SDN) controller, a network packet broker, etc.) in accordance with aspects described herein may receive service chain configuration information indicating a service chain involving services performed using data processing units (DPUs) in at least one smartswitch; generate, using the service chain configuration information, one or more switching rules for causing traffic at the at least one smartswitch to be directed to one or more of the DPUs associated with the service chain; and provide the one or more switching rules to the at least one smartswitch or a management entity for implementing the one or more switching rules at the at least one smartswitch.

Advantageously, in accordance with some aspects of the subject matter described herein, an NTMSS or other system may be improved by deploying or implementing a service chain using DPUs in one or more smartswitches thereby minimizing the consumption of bandwidth and latency on external communication links (e.g., Ethernet links external to smartswitches) within a smartswitch computing environment (e.g., a network being tested, monitored, or protected). For example, in one example deployment scenario, a packet processing service chain comprising three services may be implemented by an NTMSS or other system in accordance with some aspects of the subject matter described herein such that each of the three individual services is configured to execute on a DPU that resides within the same smartswitch device. Thus, in this example, a packet flow subsequently processed by the service chain is not required to leave the smartswitch device in order to receive all of the associated processing associated with the provisioned service chain. Moreover, in such a deployment scenario, the usage of external Ethernet link bandwidth resources would be minimized by the placement of all three of the service chain services on DPUs of the same smartswitch device. Further, an NTMSS or other system may be improved by configuring a switch processor (e.g., a Switching ASIC, a programmable switch chip, etc.) of a smartswitch to utilize switching rules for causing traffic associated with a service chain to be processed by DPUs implementing services of the service chain, thereby facilitating faster and more efficient smartswitch service chaining. For example, a switch processor in a smartswitch can be configured to route or forward, in a serial manner, a packet to a DPU implementing or performing a respective service until the packet has been processed by all the services of the service chain without the packet needing to leave the smartswitch and then be redirected back to a subsequent service of the service chain by an external node.

Reference will now be made in detail to example embodiments of the subject matter described herein, examples of which are illustrated in the accompanying drawings. Wherever possible, the same reference numbers will be used throughout the drawings to refer to the same or like parts.

Figure 1:
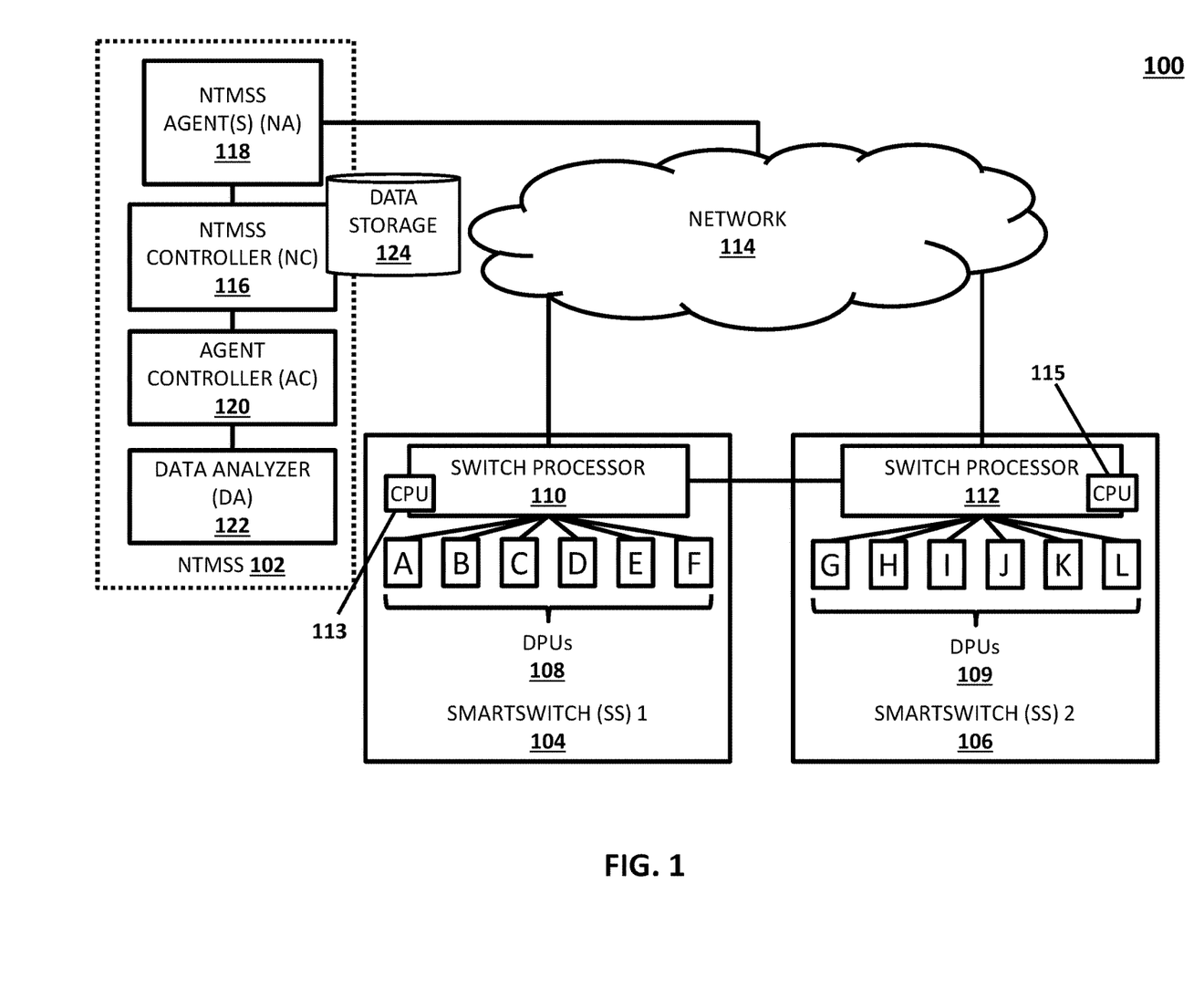
FIG. 1 is a diagram illustrating an example smartswitch computing environment comprising one or more smartswitches.

FIG. 1 is a diagram illustrating an example smartswitch computing environment 100 comprising one or more smartswitches. Environment 100 may include one or more networks and/or one or more computer platforms, nodes, or devices. For example, environment 100 may include a network testing, monitoring, and/or security system (NTMSS) 102 and one or more devices or systems that interact with or is monitored by NTMSS 102, e.g., smartswitch (SS) 104, a SS 106, and/or a network 114 (e.g., a data center architecture or switch fabric) connected to SS 104 and SS 106.

Each of SS 104 and SS 106 may represent a computing system (e.g., one or more devices, platforms, etc.) for performing switching functions and/or various other processing tasks. For example, each of SS 104 and SS 106 may include a main central processing unit (CPU) (e.g., CPU 113 or 115) for handing management or operating system tasks; a switch processor (e.g., switch processor 110 or 112) for performing switching tasks associated with forwarding traffic to or from DPUs (e.g., DPUs 108 or DPUs 109) then, where each DPU may perform one or more services, e.g., packet or flow processing tasks. In this example, communications between entities of SS 104 or SS 106 may utilize high-speed, internal links (e.g., using an Ethernet based serdes transmission system, an internal switch fabric, a communications bus, or another internal transmission system).

In some embodiments, switch processor 110 or 112 may represent or include a fixed-function switching ASIC, a programmable switching ASIC, or a switch chip. In some embodiments, switch processor 110 or 112 may include or interact with a respective main CPU (e.g., CPU 113 or 115). For example, switch processor 110 may include or interact with CPU 113 for receiving instructions from NTMSS 102 or a related entity (e.g., a smartswitch controller) and for configuring switching resources or related functionality, e.g., via SONiC configuration commands, routing rule updates, or other instructions.

In some embodiments, SS 104 or SS 106 (or DPUs therein) may be SONiC based entities and/or may utilize disaggregated application programming interfaces (APIs) for SONiC Hosts (DASH). For example, each of DPUs 108 or 109 may run a subset of SONiC functions but lack some common control functions. In this example, CPU 113 or 115 may run an enhanced version of SONiC that include common control functions or a different subset of SONiC than DPUs 108 or 109. Continuing with this example, an SDN controller or other entity may configure a high-availability (HA) configuration between DASH DPUs (e.g., where each DPU in SS 104 has a HA DPU peer in SS 106) and may set up or configure routes for HA messages (e.g., heartbeat messages, state messages, etc.) and/or routes for other traffic. In this example, the SDN controller or other entity may be configured to handle failures of single DPU cards, DPU-ToR links, an entire chassis full of DPUs, or of one smartswitch.

In some embodiments, DPUs of a given smartswitch (e.g., DPUs 108 of SS 104) may be addressable via a network address or related information (e.g., an API endpoint address or an API endpoint address and a port number). In such embodiments, traffic (e.g., messages) destined for a particular DPU may be received, e.g., by a respective switch processor or a related CPU via routing or proxying the network address or related information.

NTMSS 102 may include a computer system (e.g., one or more computing platforms, nodes, or devices) associated with testing, monitoring, or securing a network or one or more entities (e.g., network 114 including SS 104 and/or SS 106). For example, where NTMSS 102 is acting as a test system, NTMSS 102 or related entities (e.g., NTMSS agents 118) may generate and send traffic to a system under test (SUT) and/or receive traffic from the SUT and may analyze one or more performance aspects associated with the SUT. In another example, where NTMSS 102 is acting as a monitoring or security system, NTMSS 102 or related entities (e.g., NTMSS agents 118) may observe packets, copy a subset of the packets, and send the copied packets to SS 104 for packet processing and/or analysis.

In some embodiments, NTMSS 102 can be implemented using a stand-alone tool, a testing device, a network equipment test device or platform, or software executing on one or more processor(s). NTMSS 102 may be a single device or node or may be distributed across multiple devices or nodes. In some embodiments, NTMSS 102 includes or installs one or more modules or agents for performing various services, tasks, or functions. For example, NTMSS 102 may install or deploy software-based or hardware-based agents in environment 100 for performing various services or tasks, such as a traffic (e.g., packet or flow) generator for generating test traffic and/or a traffic probe agent for observing traffic sent to or from a particular entity, e.g., SS 106 or DPUs 109.

In some embodiments, NTMSS 102 may include a NTMSS controller (NC) 116, one or more NTMSS agent(s) (NA) 118, one or more agent controller(s) (AC) 120, a data analyzer (DA) 122, and data storage 124.

NC 116 may be any suitable entity or entities (e.g., software executing on a processor, a field-programmable gateway array (FPGA), and/or a fixed-function ASIC, a programmable ASIC (e.g., P4-programmable ASIC), or a combination of software, an FPGA, and/or an ASIC) for performing one or more aspects associated with configuring or managing testing, monitoring, or security. For example, NC 116 may determine that NAs 118 are needed for performing a testing, monitoring, or security task or service and may deploy or facilitate deploying NAs 118 in environment 100.

In some embodiments, NC 116 may interact with or include AC 120 for configuring, deploying, and/or managing NA(s) 118. AC 120 may be any suitable entity or entities (e.g., software executing on a processor, an ASIC, an FPGA, or a combination of software, an ASIC, or an FPGA) for controlling and/or deploying and/or managing one or more NA(s) 118 (e.g., SA(s) or other agents) in environment 100. For example, AC 120 may include a smartswitch controller or an SDN controller or related functionality for deploying various NA(s) 118 on DPUs in environment 100.

NA(s) 118 may be any suitable entity or entities (e.g., software executing on a processor, an ASIC, an FPGA, or a combination of software, an ASIC, or an FPGA) for performing one or more services or tasks. For example, NA(s) 118 may include software or logic for generating and/or sending test traffic, for monitoring observing traffic during testing, a stop test execution agent for stopping or pausing a test (e.g., based on preconfigured criteria being met), and/or for collecting test results or related information, e.g., from various NA(S) 118. For example, some NAs 118 may be deployed on one or more external or stand-alone device(s) and may be configured for generating test traffic. In another example, one NA 118 may be deployed (e.g., installed) on DPU C in SS 104 for monitoring its internal smartswitch traffic and another NA 118 may be deployed in DPU C (or another DPU) in SS 104 for sending test traffic directly to DPUs in SS 104.

In some embodiments, NA(s) 118 may include a service agent (SA). For example, an SA may include software or logic for performing a packet processing task or other task or service and may be chainable, e.g., packets may be processed by multiple SAs in a serial manner, such as one after the other. In some embodiments, one or more related SAs may be grouped or identified as a service chain. For example, NC 116 or a related entity may configure and deploy SAs for processing relevant packets in a serial manner and may refer to this serial processing of packets or packet flows as a service chain.

In some embodiments, NA(s) 118 may be connected to one or more entities in environment 100. For example, e.g., where NA 118 is an external device connected to network 114 or a module executing on a node in network 114, NA 118 may be instructed (e.g., by NC 116) to initiate a test session by sending test traffic to SS 104 and SS 106 via network 114. In another example, e.g., where NA 118 is software executing on one or more DPUs of SS 104 and SS 106, NA 118 may be instructed (e.g., by NC 116) to initiate a test session by sending test traffic to SS 104 and SS 106 directly or via network 114.

In some embodiments, NA(s) 118 may be configurable by NTMSS 102 to perform various aspects of traffic generation and related reporting. For example, NTMSS 102 or a related entity (e.g., NC 116 or AC 120) may configure NA 118 to generate test traffic directed to a particular DPU or smartswitch of interest and to report various traffic generation related metrics or other metrics to NC 116 or a related entity periodically (e.g., every five minutes) or aperiodically (e.g., dynamically, on request, or after a test session or test run is completed).

In some embodiments, NA(s) 118 may be configurable by NTMSS 102 to perform various aspects of traffic monitoring and reporting. For example, NTMSS 102 or a related entity (e.g., NC 116 or AC 120) may configure NA 118 to monitor network traffic and to report various traffic related metrics to NC 116 or a related entity periodically (e.g., every five minutes) or aperiodically (e.g., dynamically, on request, or after an expected workload is below a threshold value). In another example, various NAs 118 may be configured to intercept or observe original traffic traversing various links in environment 100 and/or to generate data (e.g., metrics, feedback, or other information). In this example, NTMSS 102 or a related entity (e.g., NC 116 or AC 120) may configure DA 122 to collect feedback or metrics from NAs 118 deployed in environment 100 and to generate reports or other information based on the collected information.

In some embodiments, NA(s) 118 may be configurable by NTMSS 102 to perform various aspects of security and reporting. For example, NTMSS 102 or a related entity (e.g., NC 116 or AC 120) may configure NA 118 to monitor network traffic, to identify or detect security issues (e.g., intrusions or malicious activities), and to report various security related metrics to NC 116 or a related entity periodically (e.g., every five minutes) or aperiodically (e.g., dynamically, on request, or when a security threat is detected).

In some embodiments, NTMSS 102 or related entities may be configured to test or observe HA configurations between HA peers, e.g., SS 104 and SS 106 or DPUs therein. For example, NTMSS 102 or NC 116 may configure NAs 118 to test HA aspects involving SS 104 and SS 106 or DPUs therein. In this example, NTMSS 102 or related entities may test failover detection, related failover performance, and/or other aspects by monitoring one or more links via NA 118. In another example, NTMSS 102 or related entities may test or monitor a DASH HA configuration by using one or more NA(s) 118 for monitoring HA related messages (e.g., DPU-DPU traffic, such as HA sync or failover messages) from DPUs 108 of SS 104 and determining whether the information is processed appropriately, e.g., by updating a route, withdrawing a route, updating an active flow table entry, or the like.

In some embodiments, e.g., where NTMSS 102 includes or acts as a network monitoring and/or security system, NTMSS 102 may include or interact with a network packet broker (NPB) or a controller (e.g., NC 116 or AC 120) for implementing a monitoring or security service chain that involves the invocation (or potential invocation) of multiple monitoring or security services or SAs. Such services or SAs may be deployed as network addressable entities or may non-addressable entities, e.g., "bumps in the wire". In some embodiments, user instructions (e.g., a declarative or intent-based monitoring or security objective, or explicit instructions specifying which network elements and/or network traffic are to be monitored and which monitoring and/or security SAs are part of the service chain) may received and used by NTMSS 102 or another entity when implementing a testing service chain.

In some embodiments, monitoring services (e.g., performed by one or more SAs) may include, but are not limited to, packet filtering, packet modification, packet manipulation, mirroring with optional truncation, packet deduplication, packet header stripping, packet trimming, packet burst protection, packet decryption processing, packet encryption processing, packet encapsulation, packet data masking, packet capture, flow record generation, packet logging, packet metadata generation, application identification, signature detection, packet or flow geolocation tagging, packet correlation, GPRS tunneling protocol (GTP)—session initiation protocol (SIP) correlation, network tool load balancing, mobile subscriber packet or flow sampling, or other packet or flow processing services.

In some embodiments, security services (e.g., performed by one or more SAs) may include, but are not limited to, packet or flow blocking, packet or flow redirection, threat insight analysis processing, threat reporting, intrusion detection processing, intrusion prevention processing, data exfiltration detection and prevention processing, artificial intelligence or machine learning security model training, packet filtering rule generation, firewall rule generation, or other security services, e.g., a service that relies on packet or flow analysis.

In some embodiments, e.g., where NTMSS 102 includes or acts as a network testing system, NTMSS 102 may include or interact with NC 116, AC 120, or another controller for implementing a testing service chain that involves the invocation (or potential invocation) of multiple testing services or SAs during the testing of a SUT (e.g., network 114 and SS 104 and SS 106). Such services or SAs may be deployed as network addressable entities or may non-addressable entities, e.g., "bumps in the wire". In some embodiments, user instructions (e.g., a declarative or intent-based testing or impairment objective, or explicit instructions specifying which network elements and/or network traffic is to be monitored and which monitoring and/or security SAs are part of the service chain) may received and used by NTMSS 102 or another entity when implementing a testing service chain.

In some embodiments, testing or impairment services (e.g., performed by one or more SAs) may include, but are not limited to an impairment service (e.g., for causing latency, jitter, dropped packets, etc.), a capture service, a replication service, a meta data generation service, a flow record generation service, a packet or flow analysis service, a metric generation service, an encapsulation and forwarding service, or other testing or impairment services.

In some embodiments, NTMSS 102 or related entities may deploy or implement a service chain comprising services or SAs executing on DPUs 108 and/or 109, thereby minimizing the consumption of bandwidth and latency on external communication links (e.g., Ethernet links outside of SS 104 or SS 106) within a smartswitch computing environment (e.g., a network being tested, monitored, or protected). For example, NTMSS 102 or a related controller may use environment topology information to identify a smartswitch (e.g., SS 104) that at least two services in a multi-service service chain can be concurrently deployed. In this example, after the at least two services are deployed to DPUs on the same smartswitch, NC 116 or AC 120 may include SDN controller-like functionality for generating instructions for manipulating switching or routing rules within the associated smartswitch (e.g., via border gateway protocol (BGP)) for effectively creating the desired service chain within the smartswitch.

In some embodiments, NTMSS 102 or related entities may configure network nodes or other entities in environment 100 for preparing and/or providing traffic for service chain processing. For example, when NTMSS 102 or related entities is operating in an inline mode, NA 118 (e.g., a network tap or monitoring agent) may intercept packets or flows of interest that are transiting network 114, and may redirect them towards SS 104 including DPUs 108 hosting or implementing two or more SAs of a service chain (e.g., a first SA may be implemented on DPU A 108 and a second SA may be implemented on DPU B 108). In this example, NA 118 may use encapsulation and a tunneling protocol (or other techniques) for steering traffic of interest to SS 104 or a first SA of the service chain. Continuing with this example, after service chain processing, NA 118 may decapsulate the packets and forward them towards their respective destinations.

In some embodiments, NTMSS 102 or related entities may generate, update, and/or provide switching rules (e.g., routing rules or related information) for switch processors (e.g., switch processor 110 or 112) of smartswitches (e.g., SS 104 or SS 106) for causing packets arriving (e.g., from one or more NAs 118) for service chain processing to be forwarded appropriately. For example, where a service chain includes a first SA implemented on DPU A 108 and a second SA may be implemented on DPU B 108, switching rules may be received and implemented at SS 104 that cause switch processor 110 to send a packet arriving from NA 118 (e.g., a network tap or monitoring agent) for service chain processing to be forwarded to DPU A 108 implementing the first SA. After the first SA processing is completed, DPU A 108 may forward the packet back to switch processor 110. In this example, switch processor 110 may use the switching rules to forward the packet to DPU B 108 implementing the second SA (e.g., forwarding may be accomplished using IP or source MAC routing or other techniques). After the second SA processing is completed, DPU B 108 may forward the packet back to switch processor 110 and then switch processor 110 may forward the packet back to NA 118.

In some embodiments, utilizing various aspects of smartswitch service chaining described herein, NTMSS 102 or related entities may reduce latency regarding packet processing. For example, when some or all of SAs of a service chain are intentionally implemented on DPUs within the same smartswitch, inter-DPU transit times are likely to be minimized. In this example, by having multiple SAs of a service chain implemented using DPUs in the same smartswitch, bandwidth resource consumption of links that are external to the smartswitch are reduced. In some embodiments, packets being processed by a service chain may be directed between DPUs using source MAC routing or other routing techniques that enable the DPUs to perform as layer 2 devices or as "bumps in the wire".

In some embodiments, NTMSS 102 or related entities (e.g., NC 116 and/or AC 120) may access or utilize data storage 124. Data storage 124 may represent any suitable entity (e.g., a computer readable medium, a database, a storage device, or memory) for storing service chain configuration and/or definition data, NTMSS configuration data, test session data, traffic patterns, traffic or workload templates, received traffic metrics, SUT related data (e.g., topology information, connection information, etc.), agent deployment factors (e.g., user-specified test objectives usable for determining locations for deploying NAs 118), and/or other data. For example, data storage 124 may store service chain configuration information and/or topology data indicating how NTMSS 102 and related entities are connected to one or more links or devices associated with testing a SUT (e.g., SS 104 and SS 106). In another example, data storage 124 may store information for determining locations for inserting or deploying various types of NAs 118, including SAs, in SS 104 and/or SS 106.

It will be appreciated that FIG. 1 is for illustrative purposes and that various depicted entities, their locations, and/or their functions described above in relation to FIG. 1 may be changed, altered, added, or removed.

Figure 2:
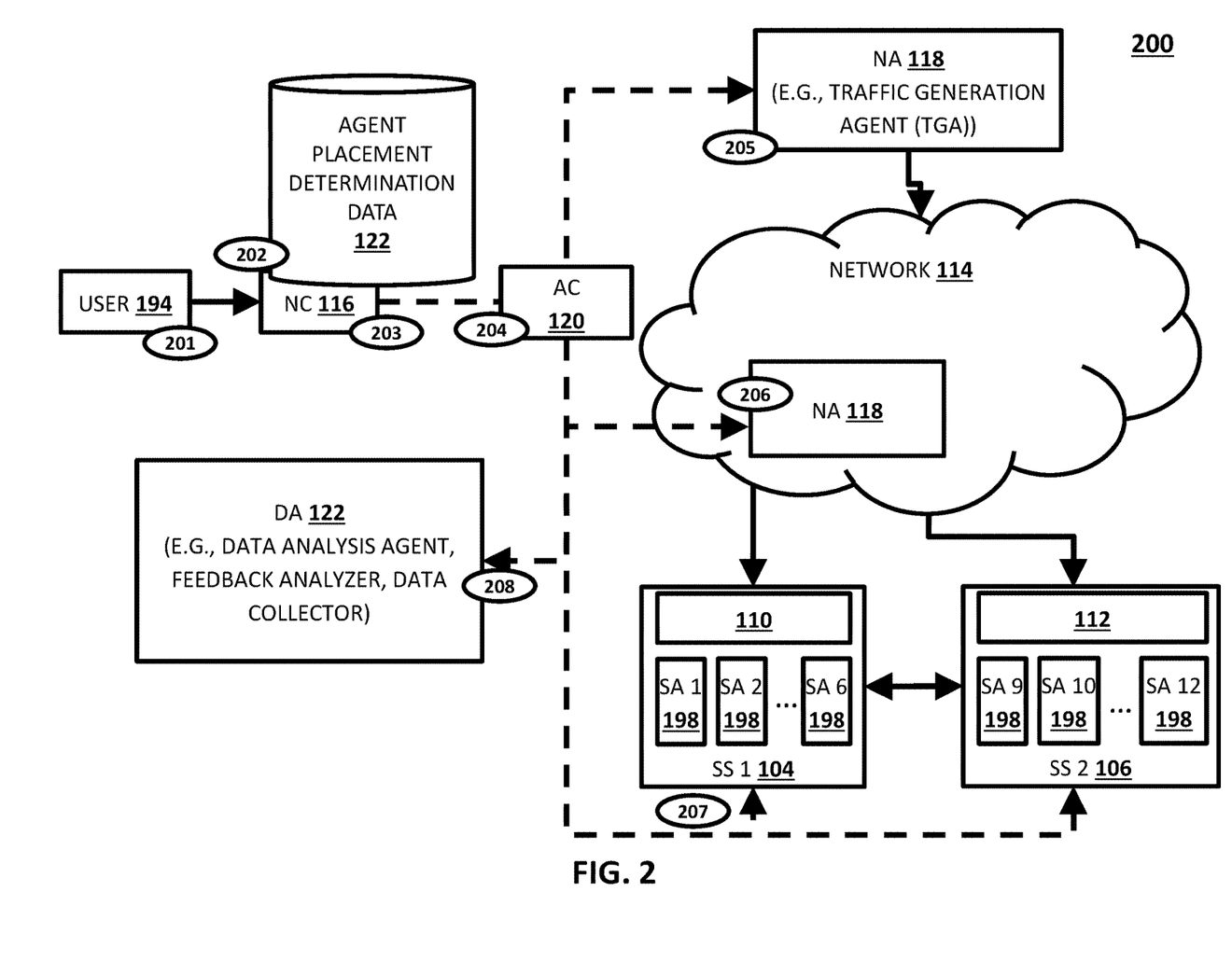
FIG. 2 illustrates an example scenario where network testing, monitoring, and/or security system (NTMSS) agents (NAs) are selected and deployed in a smartswitch computing environment.

FIG. 2 illustrates an example scenario 200 where NAs 118, including service agents (SAs) 198, are selected and placed (e.g., inserted, configured, initialized, or deployed) in various locations (e.g., target systems) of smartswitch computing environment 100. In some embodiments, NTMSS 102 or another entity (e.g., NC 116 or AC 120) may configure and facilitate deployment of various NAs 118 (e.g., monitoring agents, monitoring service applications, and/or security service applications) within environment 100 (e.g., a data center smartswitch infrastructure). In such embodiments, at least some NAs 118 may be deployed on one or more DPUs (e.g., DPUs 108 or 109) of one or more smartswitch(es) (e.g., SS 104 and/or SS 106) within environment 100 (e.g., the SUT or the monitored or protected network).

In some embodiments, NTMSS 102 or a related entity may receive user-specified information (e.g., a testing, monitoring, or security goal or objective, service chain definition information indicating services of a particular service chain, a specific smartswitch requirement, a specific DPU of a smartswitch requirement, etc.) associated with service chain processing in smartswitch computing environment 100 or entities therein (e.g., SS 104 and SS 106). In such embodiments, NTMSS 102 or a related entity may use the user-specified information and other information (e.g., topology information and/or environment information) to determine locations for deploying NAs 118 (e.g., monitoring agents, monitoring service applications, and/or security service applications) and SAs 198 (e.g., adding all SAs 198 of a service chain to the same smartswitch if possible) in environment 100 and may provide agent deployment information (e.g., configuration instructions) indicating the location for deploying each NA 118 to a respective target system (e.g., SS 104 or a DPU therein) or to AC 120 (e.g., a smartswitch controller or an SDN controller). For example, NTMSS 102 or a related entity (e.g., NC 116) may use topology information associated with environment 100 (e.g., the SUT or the monitored or protected network) to determine a smartswitch on which a service chain can or should be deployed. In this example, the topology information may be obtained from an orchestration subsystem associated with NTMSS 102 or via manual user provisioning and may indicate DPU utilization information associated with smartswitches in environment 100.

Referring to scenario 200, in step 201, e.g., during NTMSS related configuration, user 194 (e.g., an NTMSS operator) may provide agent deployment goals or other information to NC 116. For example, user 194 may directly specify a DPU or smartswitch of interest via an NTMSS provisioning API or other user interface. In another example, user 194 may specify a testing, monitoring, or security objective or goal (e.g., a testing goal or objective of "test IPv6 processing capabilities in data center", a monitoring goal or objective of "computing latency of HA messages between DPUs", or a security goal or objective of "scanning a payload of each HTTP POST message for malicious content") and have NTMSS 102 automatically determine a smartswitch or a specific DPU in a smartswitch for implementing NAs 118 and/or SAs 198.

In step 202, NC 116 or a related entity (e.g., an agent deployment module) may receive and utilize user input in determining locations for deploying various NAs 118 and SAs 198.

In step 203, NC 116 or a related entity may generate agent deployment information indicating locations for deploying various NAs 118 and SAs 198 and may send or provide the agent deployment information to AC 120. In some embodiments, agent deployment information may include instructions (e.g., an executable script, a set of commands, etc.) for placing (e.g., inserting, deploying, or provisioning) NAs 118 and SAs 198 in and around network 114 of environment 100. In some embodiments, agent deployment information may include instructions or other information for causing an entity (e.g., AC 120) to place or deploy NAs 118 and SAs 198 in and around network 114 of environment 100. For example, agent deployment information may include smartswitch affinity information, a smartswitch identifier, or a DPU identifier indicating to AC 120 where each SA 198 should be placed.

In step 204, AC 120 or a related entity may receive the agent deployment information and use the agent deployment information to generate instructions for deploying various NAs 118 in or around network 114 of environment 100 and deploying SAs 198 in SS 104 and/or SS 106.

In step 205, one or more NAs 118 may be deployed or placed on a device or platform external to network 114. For example, AC 120 or a related entity may send instructions or other information (e.g., an executable file) to a programmable switch device located outside of network 114 and may instruct the programmable switch device to implement NA 118, e.g., a traffic generation agent, for sending test traffic to nodes in network 114.

In step 206, one or more of NAs 118 may be deployed or placed on nodes (e.g., programmable switch devices) in network 114. In some embodiments, AC 120 or a related entity may send instructions or other information (e.g., an executable file) to multiple programmable switch devices in network 114 and may instruct the programmable network devices to implement NAs 118 in network 114. For example, NAs 118 may act as a TGA when a test session is initiated, e.g., by sending test traffic to SS 104 and/or SS 106 via network 114. In another example, NAs 118 may act as a TMA or network tap, e.g., by observing and copying traffic to or from SS 104 and/or SS 106 traversing network 114.

In step 207, various SAs 198 may be deployed or placed on SS 104 and/or SS 106. For example, AC 120 or a related entity may send instructions (e.g., commands) or other information to SS 104 for implementing different SAs 198 on DPUs 108 and/or DPUs 109.

In step 208, DA 122 (e.g., a data analysis agent) may be deployed or placed on a device or platform that is external to SS 104 and SS 106. For example, AC 120 or a related entity may send instructions or other information (e.g., an OS or virtual container image) to a server and may instruct the server to implement DA 122 (e.g., a data analysis agent).

In this example, various NAs 118 may periodically or aperiodically send performance results or feedback information to DA 122.

It will be appreciated that FIG. 2 and steps 201-208 are for illustrative purposes and that different and/or additional actions may be performed when placing or deploying NAs 118 and SAs 198 in environment 100 and, moreover, that steps 201-208 or related actions may be performed by different entities than those depicted in FIG. 2.

Figure 3:
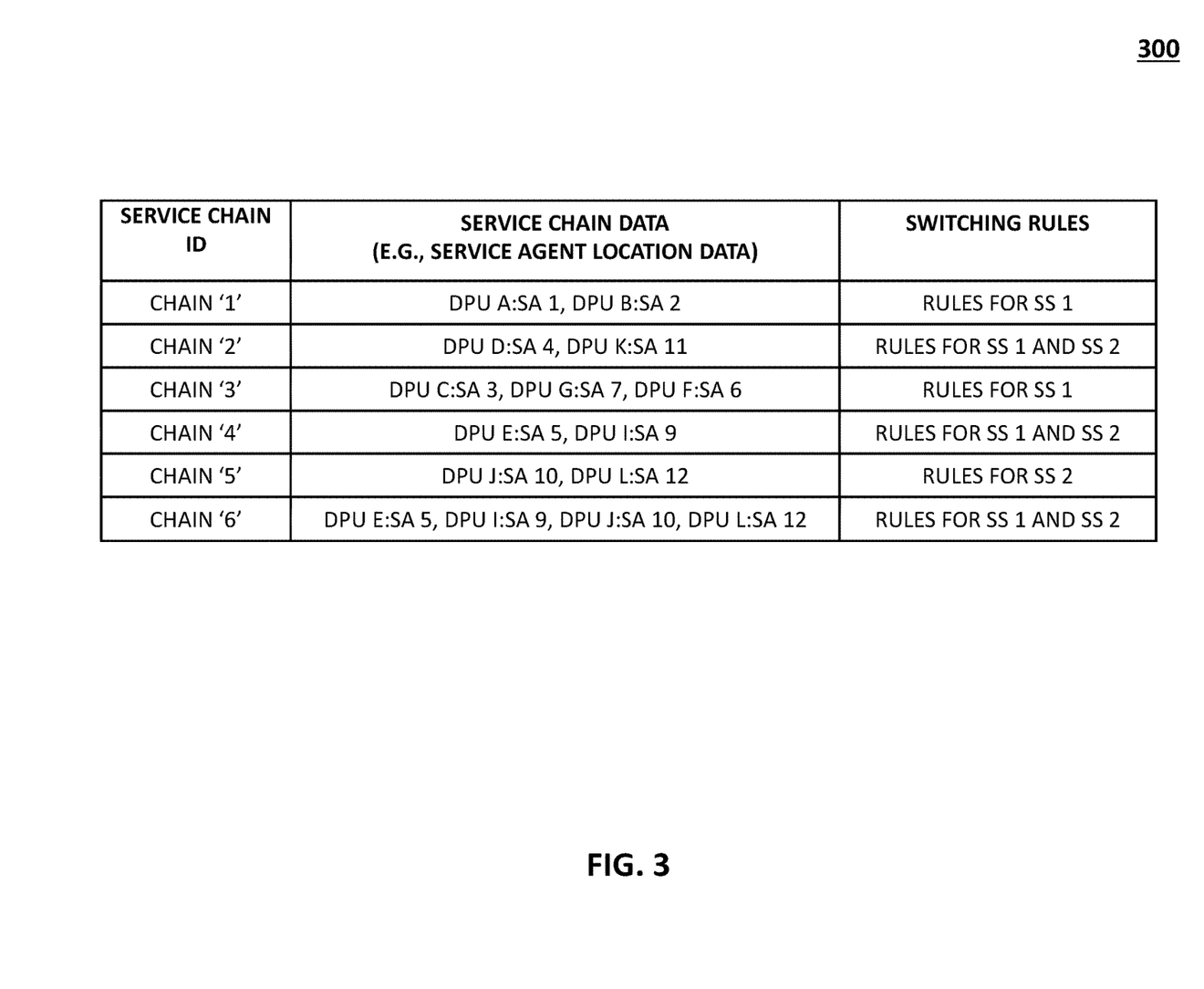
FIG. 3 illustrates example service chain configuration data associated with a smartswitch computing environment.

FIG. 3 illustrates example service chain configuration data 300 usable for determining locations for placing or inserting NA(s) 118 in environment 100. In some embodiments, service chain configuration data 300 or portions or variations thereof may be accessed and/or stored by NC 116, AC 120, SS 104, SS 106, and/or other entities using one or more data structures or storage devices, e.g., data storage 122.

In some embodiments, service chain configuration data 300 may include any suitable information for selecting, determining, or generating switching rules or related information for causing smartswitches or switch processors therein to route or forward appropriate packets to SAs 198 performing services of a service chain.

Referring to FIG. 3, service chain configuration data 300 may be depicted using a table representing associations between a service chain identifier, service chain data (e.g., services and/or locations thereof), and switching and/or routing rules. For example, each row or association may represent a relationship indicating that a service chain identifier comprising a number of services implemented or deployed on one or more smartswitches and related switching or routing rules for causing switch processors of smartswitches to route or forward traffic to DPUs implementing SAs 198.

A service chain identifier may include any suitable information for identifying a service chain comprising a series or group of services (e.g., SAs 198). For example, a service chain identifier may be a value (e.g., an alphanumeric value, an integer, or a letter that uniquely identifies a service chain comprising one or more services that are to be performed, e.g., serially.

Service chain data may include any suitable information for defining or describing services, order of services, and/or locations of services associated with a service chain. In some embodiments, service chain data may include network addresses, port numbers, and/or topology related information for indicating where a service is implemented. For example, service chain data associated with service chain '1' indicates that the service chain includes a first service (SA 1 198) implemented or deployed on DPU A 108 of SS 104 and a second service (SA 2 198) implemented or deployed on DPU B 108 of SS 104. In another example, service chain data associated with service chain '2' indicates that the service chain includes a first service (SA 4 198) implemented or deployed on DPU D 108 of SS 104 and a second service (SA 11 198) implemented or deployed on DPU K 109 of SS 106.

In some embodiments, service chain data may indicate filter or match criteria for identifying traffic that is to be processed by a corresponding service chain. For example, service chain data associated with service chain '1' may indicate that only HTTP or HTTPS traffic should be processed by the service chain. In another example, service chain data associated with service chain '2' may indicate that only voice over IP (VoIP) traffic or traffic destined for a particular IP address and port should be processed by the service chain.

Switching rules may include any suitable information for directing or causing traffic in a smartswitch (e.g., SS 104) to be sent or forwarded to relevant DPUs for service chain processing. For example, switching rules may include instructions, commands, or executables for causing switch processor 110 to identify relevant packets that need service chain processing and to send the packets to an appropriate destination (e.g., a respective DPU where a next service is implemented).

In some embodiments, switching rules or related information may be generated and provided for multiple smartswitches (e.g., SS 104 and SS 106). For example, when one or more services (e.g., SAs 198) of a service chain cannot be implemented or deployed on the same smartswitch, NTMSS 102 or another entity (e.g., NC 116) may analyze network information and/or topology information and may determine a service chain deployment or configuration that utilizes SS 104 and SS 106. In this example, NTMSS 102 or another entity (e.g., NC 116) may generate and provide appropriate switching rules to SS 104 and SS 106 for causing traffic to be processed by the service chain.

It will be appreciated that service chain configuration data 300 in FIG. 3 is for illustrative purposes and that different and/or additional information may also be stored or maintained. Further, it will be appreciated service chain configuration data 300 or related data may be stored in various data structures, memories, media, and/or in one or more locations.

Figure 4:
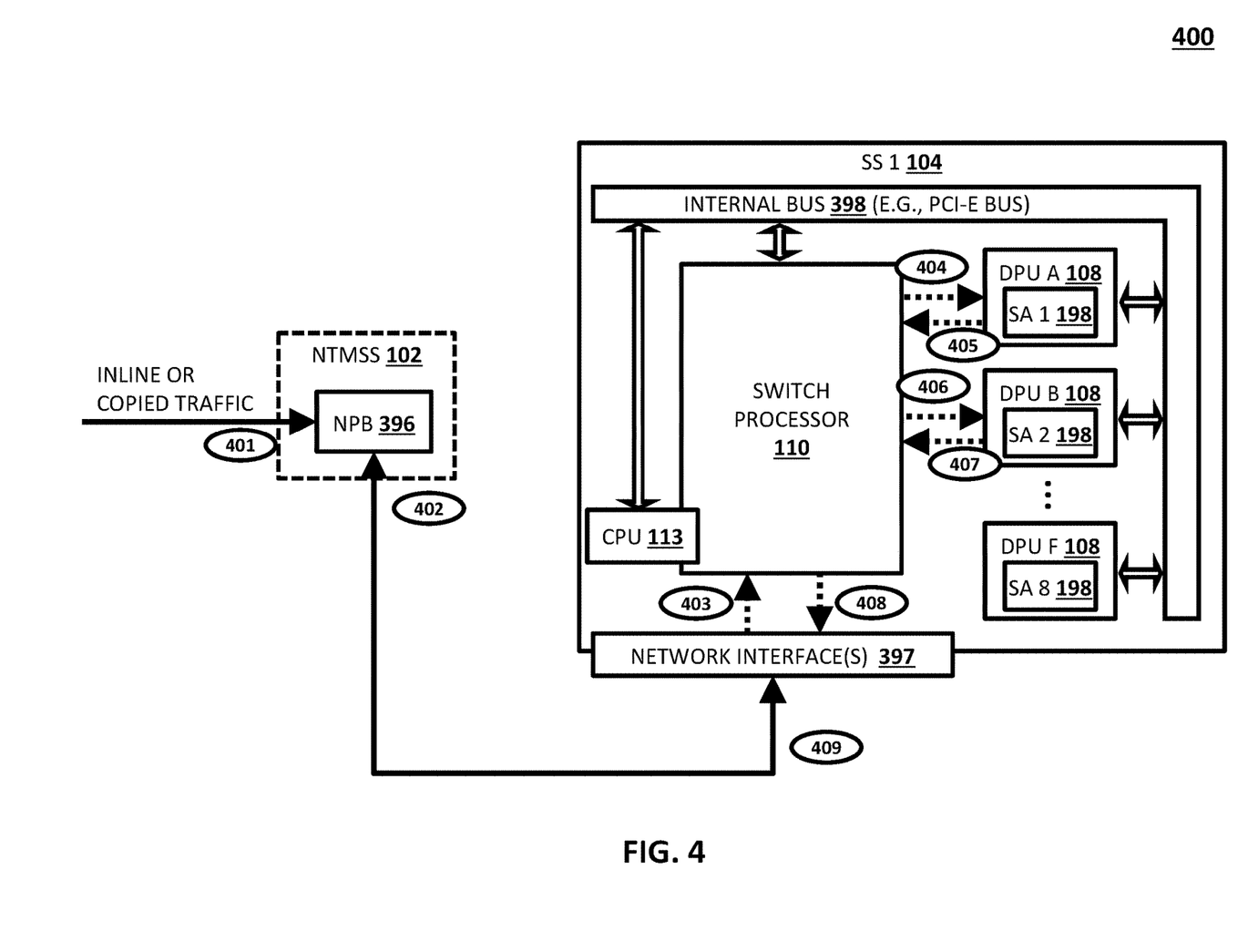
FIG. 4 illustrates an example scenario where traffic is processed using a service chain.

FIG. 4 illustrates an example scenario 400 where traffic (e.g., one or more packets) uses a service chain. Referring to FIG. 4, scenario 400 may include NTMSS 102 acting as a network monitoring and/or security system and may include or interact with an NPB 396, e.g., deployed in network 114 or another location. For example, NPB 396 may be configured to operate in an inline mode and may intercept packets or flows of interest that are transiting network 114, and redirect them towards SS 104 hosting or implementing a service chain comprising SA 1 198 and SA 2 198. In another example, NPB 396 may be configured to operate in an out-of-band mode and may receive copies of packets or flows of interest transiting network 114 from network taps, and redirect them towards SS 104 hosting or implementing a service chain comprising SA 1 198 and SA 2 198.

In some embodiments, after or during a service chain configuration and/or deployment in environment 100, NTMSS 102 or a related entity may provision or cause to be provisioned an SA 1 198 (e.g., an application for performing a first packet processing task) on DPU A 108 and an SA 2 198 (e.g., an application for performing a second packet processing task) on DPU A 108 within the same smartswitch, SS 104. For example, configuration information or instructions may be sent to CPU 113 from AC 120 via one or more network interface(s) 397 (e.g., a management port) and CPU 113 may use the configuration information or instructions to implement SAs 198 on DPUs 108, e.g., by sending instructions and/or executables via an internal bus 398 (e.g., internal peripheral component interconnect express (PCIe) communications bus).

In some embodiments, NTMSS 102 or a related entity (e.g., NC 116 and/or AC 120) may configure SS 104 or switch processor 110 to utilize SAs 198 when processing relevant packets. For example, NPB 396 or AC 120 may be configured to install or update switching rules (e.g., routing rules or related information) on SS 104 for effectively creating an "on-box" service chain within SS 104, e.g., relevant packets are processed by SA 1 198 then processed by SA 2 198. In this example, the "on-box" service chain may minimize service chain latency as well as minimizing the consumption of external Ethernet link bandwidth resources within the network/datacenter.

In some embodiments where NTMSS 102 or a related entity (e.g., NPB 396) and a smartswitch's physical ports (e.g., front panel or back panel ports) are connected to a software configurable patch panel device (e.g., a cross-connect device), NTMSS 102 or a related entity may communicate directly with the software configurable patch panel device for automatically connecting the monitoring system port(s) to the appropriate smartswitch's physical port(s).

Referring to scenario 400, in step 401, traffic of interest (e.g., live packets or copies of packets that meet a set of criteria, such as a IP-5 tuple) may be received by NPB 396 associated with NTMSS 102. For example, hardware-based or software-based network taps (e.g., TMA 118) may copy packets associated with a protocol and/or an application and may send these copies to NPB 396.

In step 402, NPB 396 may determine that the received traffic should be processed by a particular service chain (e.g., chain '1') comprising SA 1 198 and SA 2 198 and may forward the traffic or a version thereof to SS 104, e.g., via one or more network interface(s) 397 (e.g., an external ingress port) of SS 104 for service chain processing.

In some embodiments, NPB 396 may encapsulate the traffic before forwarding the traffic to SS 104 or may utilize another technique, (e.g., multi-protocol label switching (MPLS) or segment routing over IPv6 dataplane (SRv6)) for steering traffic to SS 104 or DPUs 108.

In step 403, the traffic may be received at SS 104 and switch processor 110 (e.g., a switching ASIC) of SS 104 may apply switching rules (e.g., routing rules) for directing the traffic to DPU A 108 for processing by SA 1 198 (e.g., the first service of the service chain). In some embodiments, switch processor 110 of SS 104 may use a state table, an internal ingress port, and/or a packet header or payload value for identifying which service in the service chain is next (or the latest service to be processed).

In step 404, the traffic may be received at DPU A 108 and may be processed by SA 1 198.

In step 405, after being processed by SA 1 198, the traffic may be forwarded back to switch processor 110 of SS 104, e.g., via an internal fabric.

In some embodiments, e.g., wherein encapsulation is used, DPU A 108 or SA 1 198 may modify routing header values in an encapsulating packet prior to sending the packet back to switch processor 110.

In some embodiments, after being processed by SA 1 198, the traffic may be received by SS 104 and switch processor 110 of SS 104 may apply switching rules (e.g., routing rules) for directing the traffic to DPU B 108 for processing by SA 2 198 (e.g., the second service of the service chain). In some embodiments, switch processor 110 of SS 104 may use a state table, an internal ingress port, and/or a packet header or payload value for identifying which service in the service chain is next (or the latest service to be processed).

In step 406, the traffic may be received at DPU B 108 and may be processed by SA 2 198.

In step 407, after being processed by SA 2 198, the traffic may be forwarded back to switch processor 110 of SS 104, e.g., via an internal fabric.

In some embodiments, e.g., wherein encapsulation is used, DPU B 108 or SA 2 198 may modify routing header values in an encapsulating packet prior to sending the packet back to switch processor 110.

In step 408, switch processor 110 of SS 104 may determine that the traffic has been processed by the service chain and may forward or direct the traffic or a version thereof to one or more network interface(s) 397 (e.g., an external egress port) for providing the traffic to NPB 396.

In step 409, the traffic may be received by NPB 396. In some embodiments, NPB 396 may use the processed traffic in generating or updating one or more metrics, e.g., a security or monitoring related metric.

In some embodiments, e.g., wherein encapsulation is used, NPB 396 may decapsulate processed traffic before sending the traffic onward toward an intended destination, e.g., when NPB 396 is operating in an inline mode and the traffic does not trigger a security response (e.g., a discard or quarantine action).

In some embodiments, e.g., where service chain processed traffic is copied packets, processed traffic may be discarded by NPB 396 or not forwarded onward.

It will be appreciated that FIG. 4 and steps 401-409 are for illustrative purposes and that different and/or additional actions may be performed when executing tests involving a service chain in environment 100 and, moreover, that steps 401-409 or related actions may be performed by different entities than those depicted in FIG. 4.

Further, it will be appreciated that in various contemplated embodiments where all service applications in a service chain cannot be placed, implemented, or hosted on the same smartswitch device, NTMSS 102 or another entity (e.g., NC 116) may analyze network information and/or topology information and may determine a service chain deployment or configuration that utilizes multiple smartswitches (e.g., SS 104 and SS 106). In such embodiments, NTMSS 102 or another entity may use user-specified objectives (e.g., a user-specified objective to minimize (as much as possible) overall service chain latency and/or to minimize external Ethernet link bandwidth consumption by service chain-related traffic) or other factors (e.g., available resources) when determining locations (e.g., DPUs) for implementing SAs 198.

Figure 5:
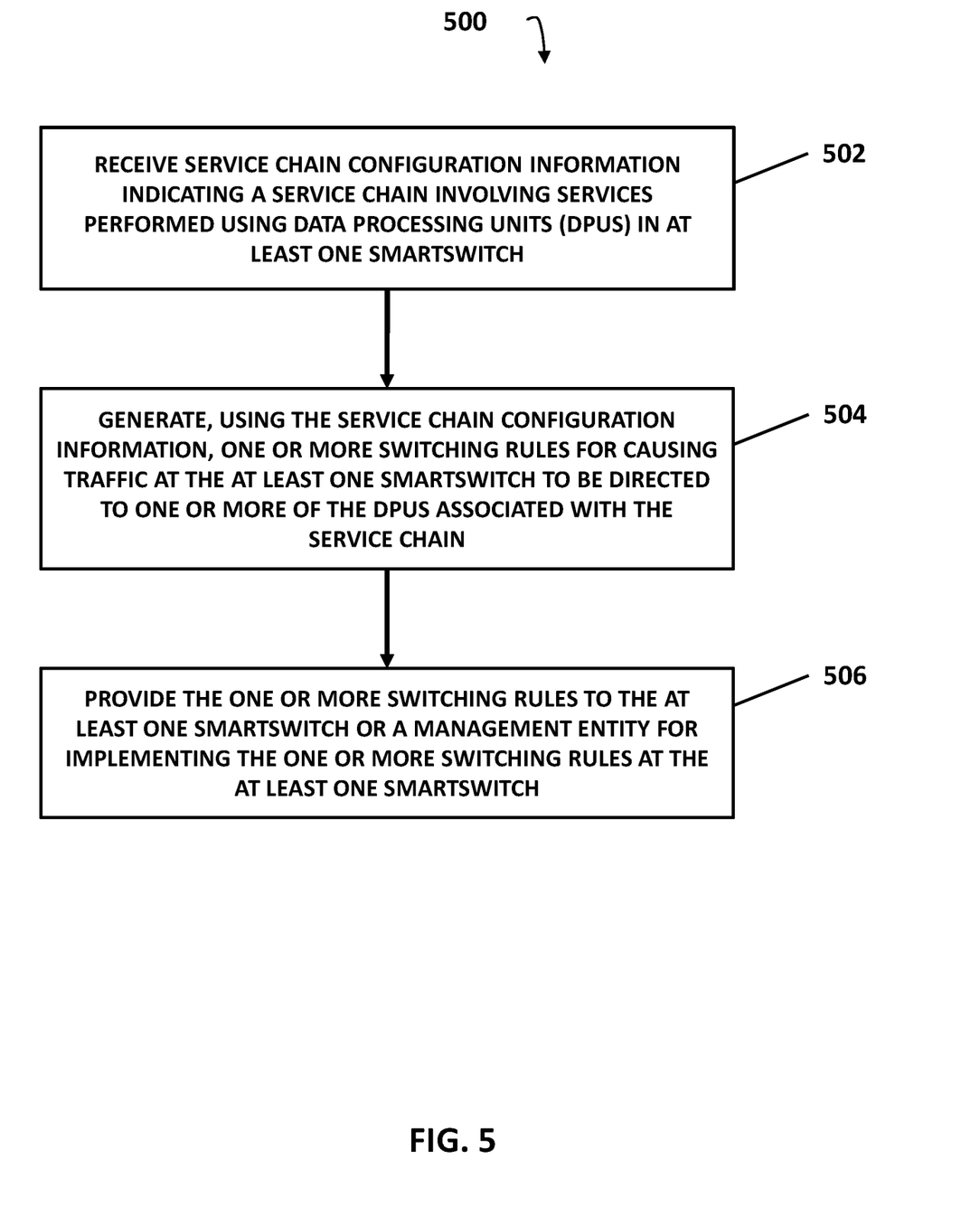
FIG. 5 is a diagram illustrating an example process for smartswitch service chaining.

FIG. 5 is a diagram illustrating an example process 500 for smartswitch service chaining. In some embodiments, process 500, or portions thereof, may be performed by or at NTMSS 102, NC 116, AC 120, a configuration device, a user device, and/or another node or module. In some embodiments, process 500 may include steps 502, 504, and 506.

Referring to process 500, in step 502, service chain configuration information may be received. In some embodiments, service chain configuration information may indicate a service chain involving services performed using DPUs in at least one smartswitch. For example, NTMSS 102 or another entity (e.g., NC 116 or AC 120) may receive service chain configuration information from user 194. In this example, the service chain configuration information may include a service chain identifier or other information indicating that a service chain includes SA 1 198 then SA 2 198.

In step 504, one or more switching rules for causing traffic at the at least one smartswitch to be directed to one or more of the DPUs associated with the service chain may be generated using the service chain configuration information. For example, after receiving information indicating a service chain that includes service 1 198 then service 2 198, NTMSS 102 or another entity (e.g., NC 116 or AC 120) may send switching rules or related instructions to SS 104 for causing switch processor 110 to identify relevant packets and forward or provide these packets to DPU A 108 where SA 1 198 is implemented. In this example, after processing by SA 1 198, the switching rules or related instructions may cause switch processor 110 to identify the packets and forward or provide these packets to DPU B 108 where service 2 198 is implemented. Continuing with this example, after processing by SA 2 198, the switching rules or related instructions may cause the packets to be discarded (e.g., if the packets are copied or no longer needed) or sent onward to another destination (e.g., to an intended destination if the service chaining is in-line).

In step 506, the one or more switching rules may be provided to the at least one smartswitch (e.g., SS 104) or a management entity (e.g., AC 120, CPU 113, or a smartswitch controller) for implementing the one or more switching rules at the at least one smartswitch. For example, NTMSS 102 or another entity (e.g., NC 116 or AC 120) may send rules or related instructions to SS 104 for installing or implementing switching rules for causing packets to be processed by a service chain.

In some embodiments, at least one smartswitch may install one or more switching rules associated with a service chain and use the service chain to process at least one packet.

In some embodiments, receiving service chain configuration information may include providing, via a user interface (e.g., a GUI) and to a user (e.g., user 194), information indicating potential smartswitches and potential services for the service chain and receiving, via the user interface and from the user, information indicating the at least one smartswitch and the services for the service chain.

In some embodiments, one or more switching rules (e.g., provided to or implemented by SS 104 or SS 106) may include a first rule for causing a first packet to be sent to a first DPU for implementing a first service of the service chain and a second rule for causing the first packet to be sent to a second DPU for implementing a second service of the service chain. For example, after receiving information indicating a service chain that includes SA 1 198 then SA 2 198, NTMSS 102 or another entity (e.g., NC 116 or AC 120) may send switching rules or related instructions to SS 104 for causing switch processor 110 to identify relevant packets and forward or provide these packets to DPU A 108 where SA 1 198 is implemented. In this example, after processing by SA 1 198, the switching rules or related instructions may cause switch processor 110 to identify the packets and forward or provide these packets to DPU B 108 where service 2 198 is implemented. Continuing with this example, after processing by SA 2 198, the switching rules or related instructions may cause the packets to be discarded (e.g., if the packets are copied or no longer needed) or sent onward to another destination (e.g., to an intended destination if the service chaining is in-line).

In some embodiments, a first DPU (e.g., DPU A 108 implemented using SA 1 198) and a second DPU (e.g., DPU B 108 implemented using SA 1 198) may be located in a first smartswitch (e.g., SS 104).

In some embodiments, a first DPU (e.g., DPU E 108 implemented using SA 5 198) may be located in a first smartswitch (e.g., SS 104) and a second DPU (e.g., DPU I 109 implemented using SA 9 198) may be located in a second smartswitch (e.g., SS 106).

In some embodiments, providing one or more switching rules to a smartswitch (e.g., SS 104 or 106) or a management entity (e.g., AC 120) may include providing instructions for causing at least one DPU (e.g., one of DPUs 108 or 109) to implement one of the services (e.g., one of SAs 1-12 198) of a service chain.

In some embodiments, providing one or more switching rules to a smartswitch (e.g., SS 104 or 106) or a management entity (e.g., AC 120) may include providing instructions for causing a switch processor (e.g., switch processor 110 or 112) of the smartswitch to install or utilize the one or more switching rules.

In some embodiments, at least one service of a service chain may include performing a monitoring or reporting task; performing a testing or analysis task; performing a security task; modifying traffic contents; impairing traffic; decrypting or re-encrypting traffic; discarding traffic; performing traffic analysis; mirroring with optional truncation; performing deduplication; generating traffic metadata or at least one traffic metric; generating NetFlow information; generating latency metric information; generating packet count metric information; performing packet capture; performing packet encapsulation; reporting at least one performance metric; or generating test traffic.

In some embodiments, a smartswitch controller (e.g., AC 120) may include a network packet broker (NPB), a NPB controller, a software defined network (SDN) controller, a test system controller, a network controller, a security device, a security controller, an impairment device, an impairment controller, a network management system, or a smartswitch service chain management module of a computing system.

It will be appreciated that process 500 is for illustrative purposes and that different and/or additional actions may be used. It will also be appreciated that various actions described herein may occur in a different order or sequence.

It should be noted that NTMSS 102, NC 116, AC 120, and/or functionality described herein may constitute one or more special purpose computing devices. Further, NTMSS 102, NC 116, AC 120, and/or functionality described herein can improve the technological field of testing networks and related nodes by providing mechanisms, systems, methods, and/or techniques for smartswitch service chaining. For example, NTMSS 102 or a related entity may utilize service chain configuration information (e.g., information indicating where particular services of a service chain are performed) in generating one or more switching rules for causing traffic at a switch processor of a smartswitch to be directed to DPUs of the smartswitch such that the traffic is processed by services implemented at the DPUs. In this example, after the traffic is processed by a first service of a service chain and arrives back at the switch processor, the traffic may be routed or forwarded to another DPU so that the traffic can be processed by a next service of the service chain. Continuing with this example, the switch processor can route or forward the traffic to relevant DPUs or nodes until the traffic is processed by all the services of the service chain.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for smartswitch service chaining, the method comprising:
   at a smartswitch controller implemented using at least one processor:
   receiving service chain configuration information indicating a service chain involving services performed using data processing units (DPUs) in at least one smartswitch, wherein the service chain configuration information includes a network testing objective and, in response to receiving the network testing objective;
   automatically determining DPUs in the at least one smartswitch for implementing service agents (SAs) to achieve the network testing objective;
   deploying the SAs on the DPUs;
   deploying a first network testing, monitoring, and/or security system (NTMSS) agent (NA) external to the at least one smartswitch and causing the first NA to send test traffic to the at least one smartswitch;
   deploying a second NA external to the at least one smartswitch and causing the second NA to function as a network tap to copy the test traffic transmitted to the at least one smartswitch and traffic transmitted by the at least one smartswitch;
   generating, using the service chain configuration information, one or more switching rules for causing the test traffic at the at least one smartswitch to be directed to the DPUs implementing the SAs; and
   providing the one or more switching rules to the at least one smartswitch or a management entity for implementing the one or more switching rules at the at least one smartswitch, wherein the smartswitch controller includes a network packet broker controller; and
   executing a test by sending the test traffic from the first NA to the at least one smartswitch, processing the test traffic using the SAs implemented on the DPUs, and copying the test traffic and the traffic transmitted by the smartswitch using the second NA.

2. The method of claim 1 comprising:
   at the at least one smartswitch:
   installing the one or more switching rules; and
   using the service chain to process at least one packet.

3. The method of claim 1 wherein receiving the service chain configuration information includes:
   providing, via a user interface and to a user, information indicating potential smartswitches and potential services for the service chain; and
   receiving, via the user interface and from the user, information indicating the at least one smartswitch and the services for the service chain.

4. The method of claim 1 wherein the one or more switching rules includes a first rule for causing a first packet to be sent to a first DPU for implementing a first service of the service chain and a second rule for causing the first packet to be sent to a second DPU for implementing a second service of the service chain.

5. The method of claim 4 wherein the at least one smartswitch includes a first smartswitch and a second smartswitch; and wherein the first DPU and the second DPU are located in the first smartswitch or the first DPU is located in the first smartswitch and the second DPU is located in the second smartswitch.

6. The method of claim 1 wherein providing the one or more switching rules to the smartswitch or the management entity includes providing instructions for causing at least one of the DPUs to implement one of the services of the service chain.

7. The method of claim 1 wherein providing the one or more switching rules to the smartswitch or the management entity includes providing instructions for causing a switch processor of the smartswitch to install or utilize the one or more switching rules.

8. The method of claim 1 wherein at least one of the services of the service chain includes performing a monitoring or reporting task; performing a testing or analysis task; performing a security task; modifying traffic contents; impairing traffic; decrypting or re-encrypting traffic; discarding traffic; performing traffic analysis; mirroring with optional truncation; performing deduplication; generating traffic metadata or at least one traffic metric; generating NetFlow information; generating latency metric information; generating packet count metric information; performing packet capture; performing packet encapsulation; reporting at least one performance metric; or generating test traffic.

9. A system for smartswitch service chaining, the system comprising:
at least one processor; and
a memory; and
a smartswitch controller implemented using the at least one processor and the memory, the smartswitch controller configured for:
receiving service chain configuration information indicating a service chain involving services performed using data processing units (DPUs) in at least one smartswitch, wherein the service chain configuration information includes a network testing objective and, in response to receiving the network testing objective:
automatically determining DPUs in the at least one smartswitch for implementing service agents (SAs) to achieve the network testing objective;
deploying the SAs on the DPUs;
deploying a first network testing, monitoring, and/or security system (NTMSS) agent (NA) external to the at least one smartswitch and causing the first NA to send test traffic to the at least one smartswitch;
deploying a second NA external to the at least one smartswitch and causing the second NA to function as a network tap to copy the test traffic transmitted to the at least one smartswitch and traffic transmitted by the at least one smartswitch;
generating, using the service chain configuration information, one or more switching rules for causing the test traffic at the at least one smartswitch to be directed to the DPUs implementing the SAs; and
providing the one or more switching rules to the at least one smartswitch or a management entity for implementing the one or more switching rules at the at least one smartswitch, wherein the smartswitch controller includes a network packet broker controller; and
executing a test by sending the test traffic from the first NA to the at least one smartswitch, processing the test traffic using the SAs implemented on the DPUs, and copying the test traffic and the traffic transmitted by the smartswitch using the second NA.

10. The system of claim 9 wherein the at least one smartswitch installs the one or more switching rules and uses the service chain to process at least one packet.

11. The system of claim 10 wherein the at least one packet is generated or provided by a device external to the at least one smartswitch or by a module or software executing on the at least one smartswitch.

12. The system of claim 9 wherein the smartswitch controller is configured for:
providing, via a user interface and to a user, information indicating potential smartswitches and potential services for the service chain; and
receiving, via the user interface and from the user, information indicating the at least one smartswitch and the services for the service chain.

13. The system of claim 9 wherein the one or more switching rules includes a first rule for causing a first packet to be sent to a first DPU for implementing a first service of the service chain and a second rule for causing the first packet to be sent to a second DPU for implementing a second service of the service chain.

14. The system of claim 13 wherein the at least one smartswitch includes a first smartswitch and a second smartswitch; and wherein the first DPU and the second DPU are located in the first smartswitch or the first DPU is located in the first smartswitch and the second DPU is located in the second smartswitch.

15. The system of claim 9 wherein the smartswitch controller is configured for providing instructions for causing at least one of the DPUs to implement one of the services of the service chain.

16. The system of claim 9 wherein the smartswitch controller is configured for providing instructions for causing a switch processor of the smartswitch to install or utilize the one or more switching rules.

17. The system of claim 9 wherein at least one of the services of the service chain includes performing a monitoring or reporting task; performing a testing or analysis task; performing a security task; modifying traffic contents; impairing traffic; decrypting or re-encrypting traffic; discarding traffic; performing traffic analysis; mirroring with optional truncation; performing deduplication; generating traffic metadata or at least one traffic metric; generating NetFlow information; generating latency metric information; generating packet count metric information; performing packet capture; performing packet encapsulation; reporting at least one performance metric; or generating test traffic.

18. A non-transitory computer readable medium having stored thereon executable instructions embodied in the non-transitory computer readable medium that when executed by at least one processor of a computing device cause the computing device to perform steps comprising:
at a smartswitch controller:
receiving service chain configuration information indicating a service chain involving services performed using data processing units (DPUs) in at least one smartswitch, wherein the service chain configuration information includes a network testing objective and, in response to receiving the network testing objective:
automatically determining DPUs in the at least one smartswitch for implementing service agents (SAs) to achieve the network testing objective;
deploying the SAs on the DPUs;
deploying a first network testing, monitoring, and/or security system (NTMSS) agent (NA) external to the at least one smartswitch and causing the first NA to send test traffic to the at least one smartswitch;
deploying a second NA external to the at least one smartswitch and causing the second NA to function as a network tap to copy the test traffic transmitted to the at least one smartswitch and traffic transmitted by the at least one smartswitch;
generating, using the service chain configuration information, one or more switching rules for causing the test traffic at the at least one smartswitch to be directed to the DPUs implementing the SAs; and
providing the one or more switching rules to the at least one smartswitch or a management entity for implementing the one or more switching rules at the at least one smartswitch, wherein the smartswitch controller includes a network packet broker controller; and executing a test by sending the test traffic from the first NA to the at least one smartswitch, processing the test traffic using the SAs implemented on the DPUs, and copying the test traffic and the traffic transmitted by the smartswitch using the second NA.

* * * * *